Patented Nov. 9, 1926.

1,606,722

UNITED STATES PATENT OFFICE.

CARLISLE K. ROOS, OF FORT DODGE, IOWA, ASSIGNOR TO UNITED STATES GYPSUM COMPANY, OF CHICAGO, ILLINOIS, A CORPORATION OF ILLINOIS.

SURFACING MATERIAL.

No Drawing.    Application filed August 20, 1924. Serial No. 733,198.

This invention relates to improvements in surfacing materials of a plastic nature, particularly for use in the decoration of the interior of buildings.

The object of this invention is the formation of a surfacing material suitable for the production of a monolithic plaster effect on non-shrinkable wallboard construction. It is particularly well adapted as a filling for crevices between the wallboard edges and when applied over the board produces a homogeneous surface by hiding the joints, nail heads or any surface defect. Ordinary oil wall paints and calcimines on account of their thin film and relatively smooth surface are incapable of accomplishing this as satisfactorily.

The composition of this surfacing material in accordance with this invention consists of a binder such as casein or ordinary glue, a fibrous extender of light amphibole asbestos fiber (air separated to produce short lengths); a non siliceous loading filler such as fine ground natural anhydrite, gypsum, or dead burned anhydrous calcium sulfate.

As it is desirable to produce a moderately washable surface, it is preferred to use casein with a weak alkali such as borax, as the binder, together with hydrated dolomite lime to promote washability. In this formula the borax causes rapid solution of the casein followed by a slow and incomplete precipitation of the casein as calcium caseate by the calcium hydroxide in the dolomitic hydrate. It has been found that a hydrated dolomite lime with its slower action and lower causticity is much preferred from a standpoint of practical application to an equivalent alkalinity from high calcium hydrated lime.

The effect of the dolomitic hydrate which is superior to the high calcium hydrate, is its slower rate of progressive precipitation which produces a slower rate of drying and enables the mechanic to treat the surface of the finish longer. Besides this, a dolomite hydrate retains its causticity during storage longer than a high calcium hydrate. This reflects improved keeping qualities in the finished product.

Fine ground anhydrite is a preferred filler, for it has been found to be a cheap, relatively insoluble and heavy white material now considered a waste by-product. It has the desirable effect, together with lithopone of weighing down the asbestos fibers and causing them to lay flat.

An example of a desirable formula, consists of casein 12 parts, borax 2 parts, fine ground asbestos fiber 40-50 parts, fine ground anhydrite 20-25 parts, lithopone 15-20 parts, hydrated dolomite lime 5 parts.

The main problem in decoration of non-shrinkable wallboard construction is the concealment of the joining edges and the prevention of hair line cracks at the joints. The asbestos fiber besides producing "bulk" and "slip" to the surfacing finish aids very materially in preventing these minute cracks by virtue of its fibrous reinforcing structure.

The constituents of the finish are blended together dry and made ready for use by the mechanic through the addition of water, mixing the preparation to a moderately heavy paste. After the wallboard joints have been filled with the same preparation mixed to a stiff putty, the finish is applied to the wallboard with a wide wall brush, and while still in a moist condition is stippled, sponged, troweled or otherwise tooled to produce various wall plaster texture effects. It is usually applied in one coat to a thickness of $\frac{1}{32}$ to $\frac{1}{16}$ inch. It is here that the bulky fibrous character of the asbestos permits the finish to be built up to considerable thickness without running or sagging on the wall.

One coat of this composition has greater hiding power and obscures the wallboard joinings better than three coats of oil, paint or calcimine, hence the economical features are obvious.

While this finish can be tinted with lime proof colors, it is also entirely practical to subsequently paint it with ordinary oil paints and glazes.

What I claim is:

1. A surfacing material adapted to be rendered pasty or plastic by the addition of water comprising twelve parts of casein, two parts of borax, approximately forty-five parts of asbestos fibers, approximately twenty-two parts of fine ground natural anhydrite, approximately seventeen parts of lithopone and five parts of hydrated dolomite lime all blended together.

2. A surfacing material adapted to be rendered pasty or plastic by the addition of water, comprising casein, borax, asbestos fibre, natural anhydrite, lithopone and hydrated dolomite lime all blended together dry in substantially the proportions specified.

3. A surfacing material comprising casein, borax, mineral fibres and natural anhydrite both ground fine, lithopone, and hydrated dolomite lime, all blanded together dry and sufficient water to render the mass pasty.

4. A surfacing material for plaster wallboard adapted to be rendered pasty or plastic by the addition of water, comprising twelve parts of casein, two parts of borax, approximately seventeen parts of lithopone, approximately five parts of hydrated dolomite lime, approximately forty five parts of mineral fibres and approximately twenty two parts of natural anhydrite both ground fine, and all of the ingredients being mixed and blended together dry ready for use.

5. A surfacing material comprising casein, borax, mineral fibres and anhydrous calcium sulphate both ground fine, lithopone, and hydrated dolomite lime, all blended together dry, and sufficient water to render the mass pasty.

CARLISLE K. ROOS.